(12) United States Patent
Joe et al.

(10) Patent No.: US 6,963,955 B1
(45) Date of Patent: Nov. 8, 2005

(54) SCATTERING AND GATHERING DATA FOR FASTER PROCESSING

(75) Inventors: Truman Joe, Mountain View, CA (US); Stephen Wilson Turner, Menlo Park, CA (US); Allisa Lee, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 395 days.

(21) Appl. No.: 10/223,328

(22) Filed: Aug. 20, 2002

(51) Int. Cl.$^7$ ............................................... G06F 15/16

(52) U.S. Cl. ...................... 711/154; 709/201; 709/203

(58) Field of Search ...................... 711/154; 709/201, 709/203

(56) References Cited

U.S. PATENT DOCUMENTS

| | | | | |
|---|---|---|---|---|
| 4,783,730 A | * | 11/1988 | Fischer | 710/5 |
| 5,440,687 A | * | 8/1995 | Coleman et al. | 709/236 |
| 5,696,922 A | * | 12/1997 | Fromm | 711/5 |
| 5,809,527 A | * | 9/1998 | Cooper et al. | 711/133 |
| 2002/0156612 A1 | * | 10/2002 | Schulter et al. | 703/23 |
| 2003/0023766 A1 | * | 1/2003 | Elnozahy | 709/310 |
| 2003/0120835 A1 | * | 6/2003 | Kale et al. | 710/22 |
| 2004/0064600 A1 | * | 4/2004 | Lee et al. | 710/22 |

* cited by examiner

*Primary Examiner*—Matthew D. Anderson
*Assistant Examiner*—Hetul Patel
(74) *Attorney, Agent, or Firm*—Harrity & Snyder LLP

(57) ABSTRACT

A system for processing packets of data may include a gather unit configured to gather data elements from a number of non-contiguous locations in a packet of data. The gather unit may place the data elements in a number of contiguous locations in the packet. A processor may be configured to process the data elements from the number of contiguous locations to generate processed data elements. A scatter unit may be configured to scatter the processed data elements to the number of non-contiguous locations in the packet.

22 Claims, 5 Drawing Sheets

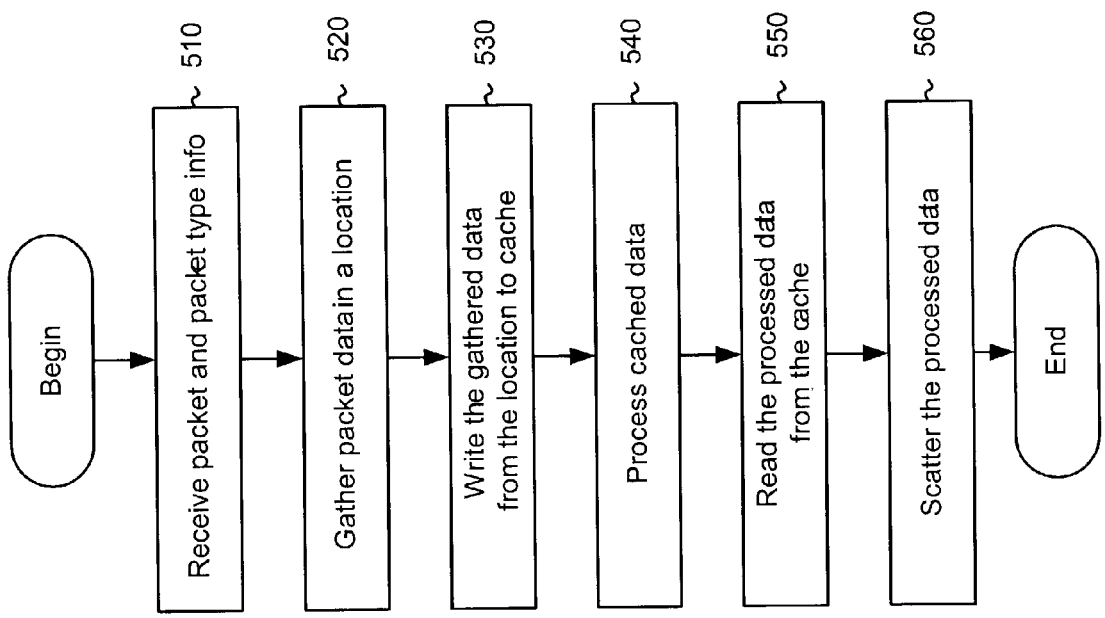

SCATTERING AND GATHERING DATA FOR FASTER PROCESSING

BACKGROUND OF THE INVENTION

1. Field of the Invention

The invention relates generally to processing data, and more particularly, to the processing of non-contiguous data elements in a unit of data.

2. Description of Related Art

Routers receive data on a physical media, such as optical fiber, analyze the data to determine its destination, and output the data on a physical media in accordance with the destination. Routers were initially designed using a general purpose processor executing large software programs. As line rates and traffic volume increased, however, general purpose processors could not scale to meet these new demands. For example, as functionality was added to the software, such as accounting and policing functionality, these routers suffered performance degradation. In some instances, the routers failed to handle traffic at a line rate when the new functionality was implemented.

To meet the new demands, purpose-built routers have been designed with components optimized for routing. These routers not only handle higher line rates and higher network traffic volume, they also add functionality without compromising line rate performance.

A purpose-built router may include a number of input and output ports from which it transmits and receives information packets. A packet received at one port is typically directed to its appropriate output port based on an examination and processing of the packet's header information, which includes an indication of the packet's destination. A high-performance router must accordingly examine and process the information packets at a high speed.

In a purpose-built router, it may be desirable to process non-contiguous data in, for example, the header of a packet. FIG. 1 is a block diagram illustrating exemplary processing of a packet of data 110 by a processor 120 to generate a modified packet 130. Packet 110 may include data elements A, B, and C respectively located at non-contiguous locations 1, 2, and 3 in the packet. Data elements A–C conceptually represent elements of interest in packet 110, and need not be located in the header of packet 110. Further, data elements 110 may be fewer or greater in number, and may be partly contiguous (e.g., A and B may be adjacent, but C may be spaced from A and B).

Processor 120 may perform processing (e.g., route lookup) based on some of data elements A–C, and may replace some of the data elements at locations 1–3 with modified data elements (e.g., D and E, possibly reflecting a new route) to generate the modified packet 130. In FIG. 1, processor 120 may be configured to: read data element A from location 1 and read data element B from location 2 in packet 110; perform computations based on data elements A and B; and write data element D to location 1 and write data element E to location 3 in the packet. Such processing conceptually illustrates three cases: location 1 may be read and written; location 2 may be read but not written; and location 3 may be written but not read.

The arrangement shown in FIG. 1 may suffer from poor performance, however, due to the phenomenon of "spatial locality." Processor 120 generally reads and/or writes data from non-contiguous locations (e.g., locations 1–3) more slowly than, for example, a contiguous block of data. Also, packet 110 may be stored in a memory (not shown) during processing by processor 120. The time needed to access the memory may also delay processing of packet 110.

Thus, it is desirable to improve the speed of processing non-contiguous data elements in a unit of data such as a packet.

SUMMARY OF THE INVENTION

Systems and methods consistent with the principles of the invention may, among other things, provide for improving the speed of processing non-contiguous data elements in units of data.

In accordance with one purpose of the invention as embodied and broadly described herein, a system for processing data may include a gathering device configured to gather a number of data items from data unit. The gathering device may construct a digest that contains the number of data items within the data unit. A first memory may be connected to the gathering device. The first memory may be configured to store the digest. A processor may be configured to process at least one of the number of data items from the digest in the first memory. The processor may be further configured to write a number of processed data items to the digest in the first memory.

In another implementation consistent with the principles of the invention, a system for processing data units may include a gather unit configured to gather data elements from a number of first non-contiguous locations in a data unit. The gather unit may place the data elements in a number of contiguous locations in the data unit. A processor may be configured to process the data elements from the number of contiguous locations to generate processed data elements. A scatter unit may be configured to scatter the processed data elements to a number of second non-contiguous locations in the data unit.

In a further implementation consistent with the principles of the invention, a method for processing data may include gathering data elements from a number of first discontinuous locations in a chunk of data to form a continuous block of data. The continuous block of data may be processed to generate processed data elements. The processed data elements may be written to the continuous block of data. The method may also include scattering the processed data elements from the continuous block of data to a number of second discontinuous locations in the chunk of data.

In yet another implementation consistent with the principles of the invention, a method for processing data may include gathering data elements from gathering locations in a data unit to form a continuous block of data in the data unit. The continuous block of data may be written to a first memory. The continuous block of data may be processed to generate a processed block of data in the first memory. The method may also include writing the processed block of data in the first memory to the data unit. Data elements from the processed block of data may be scattered into scattering locations in the data unit.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 5 is a flow chart illustrating operation of the system of FIG. 3 consistent with the principles of the invention.

DETAILED DESCRIPTION

The following detailed description of the invention refers to the accompanying drawings. The same reference numbers may be used in different drawings to identify the same or similar elements. Also, the following detailed description does not limit the invention. Instead, the scope of the invention is defined by the appended claims and equivalents of the claim limitations.

As described herein, data within a packet may be gathered to a contiguous location, processed, and scattered to its original locations.

Exemplary System Configuration

Figure 2:
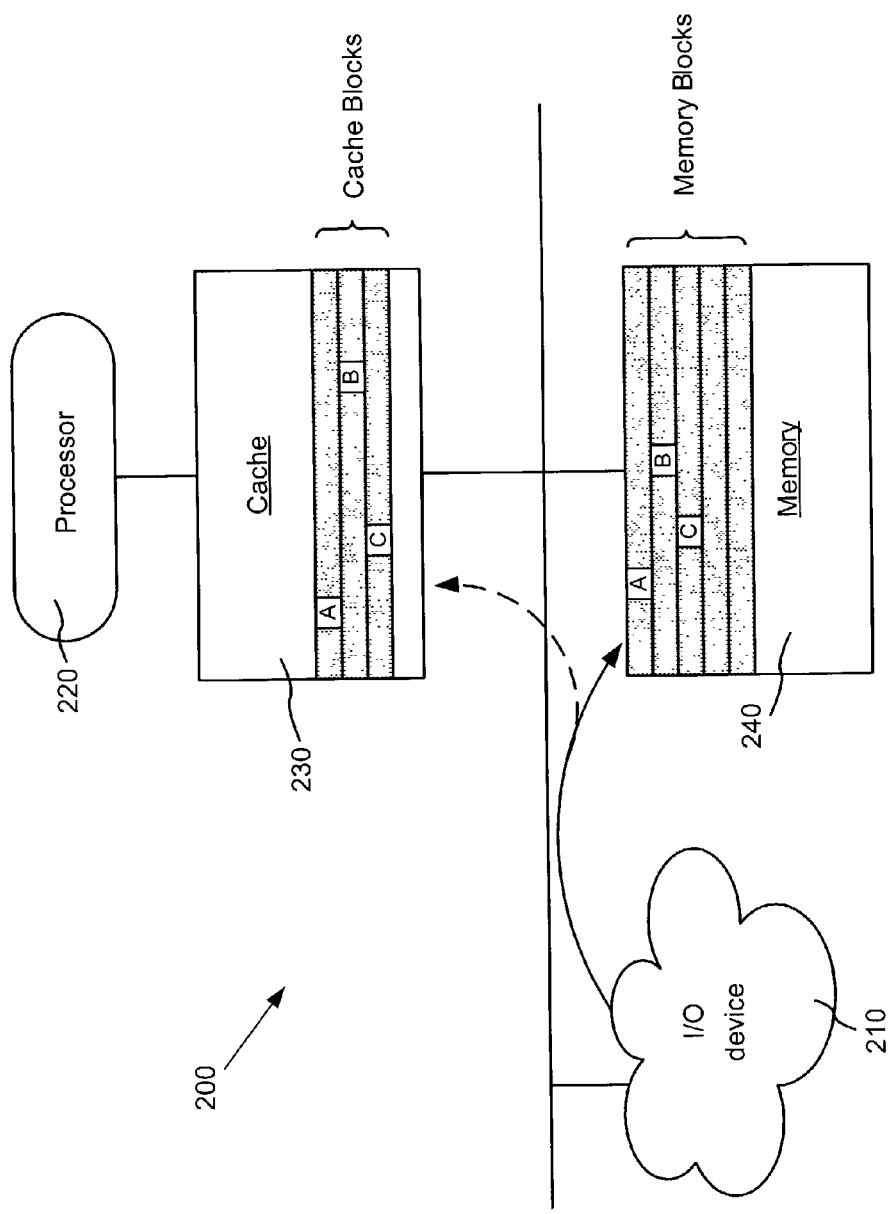
FIG. 2 is a processing system configured to process packets of data.

FIG. 2 is a block diagram illustrating an exemplary processing system 200 configured to process packets of data. System 200 may receive packets of data from a physical link, process the packets to determine destination information, and transmit the packets of data out on a link in accordance with the destination information. System 200 may include an input/output (I/O) device 210, a processor 220, a cache memory 230 (hereafter "cache"), and a memory 240.

I/O device 210 may be configured to receive and route packets of data between a physical link and cache 230/ memory 240. I/O device 210 may be configured to read and write data to and from one or both of the cache 230 and the memory 240. Typically, I/O device 210 may read/write a whole packet from/to memory 240, and may read/write a portion of the packet from/to cache 230. In one implementation, I/O device 210 may be configured to use packet type information to determine data elements of interest (e.g., A–C) within the packet.

Processor 220 may be configured to read/write data from/to either of cache 230 and memory 240. Processor 220 may be a general purpose processor or a specific purpose processor, and it may be configured to, for example, determine a next route for a packet from certain data elements (e.g., A–C) in the packet. Processor 220 may also determine which data elements it processes and their location within the packet based on packet type information, either received in the packet itself or from I/O device 210.

Cache 230 may be connected to processor 220 and to memory 240. Cache 230 may be configured for rapid access (i.e., faster than memory 240) by processor 220 during computations. Cache 230 may store information in cache blocks of a predetermined length, and typically stores some portion of a packet needed for processing. In FIG. 2, for example, cache 230 may store portions of a packet that contain the data elements of interest, A–C.

Memory 240 may be connected to processor 220 and to cache 230. Memory 240 may be configured for access (i.e., slower than cache 230) by processor 220 if necessary. Memory 240 may store information in memory blocks of a predetermined length, and typically stores the entire packet while portions are being processed by processor 220. In FIG. 2, for example, memory 240 may store a whole packet, including the portions of the packet that contain the data elements of interest, A–C.

Figure 1:
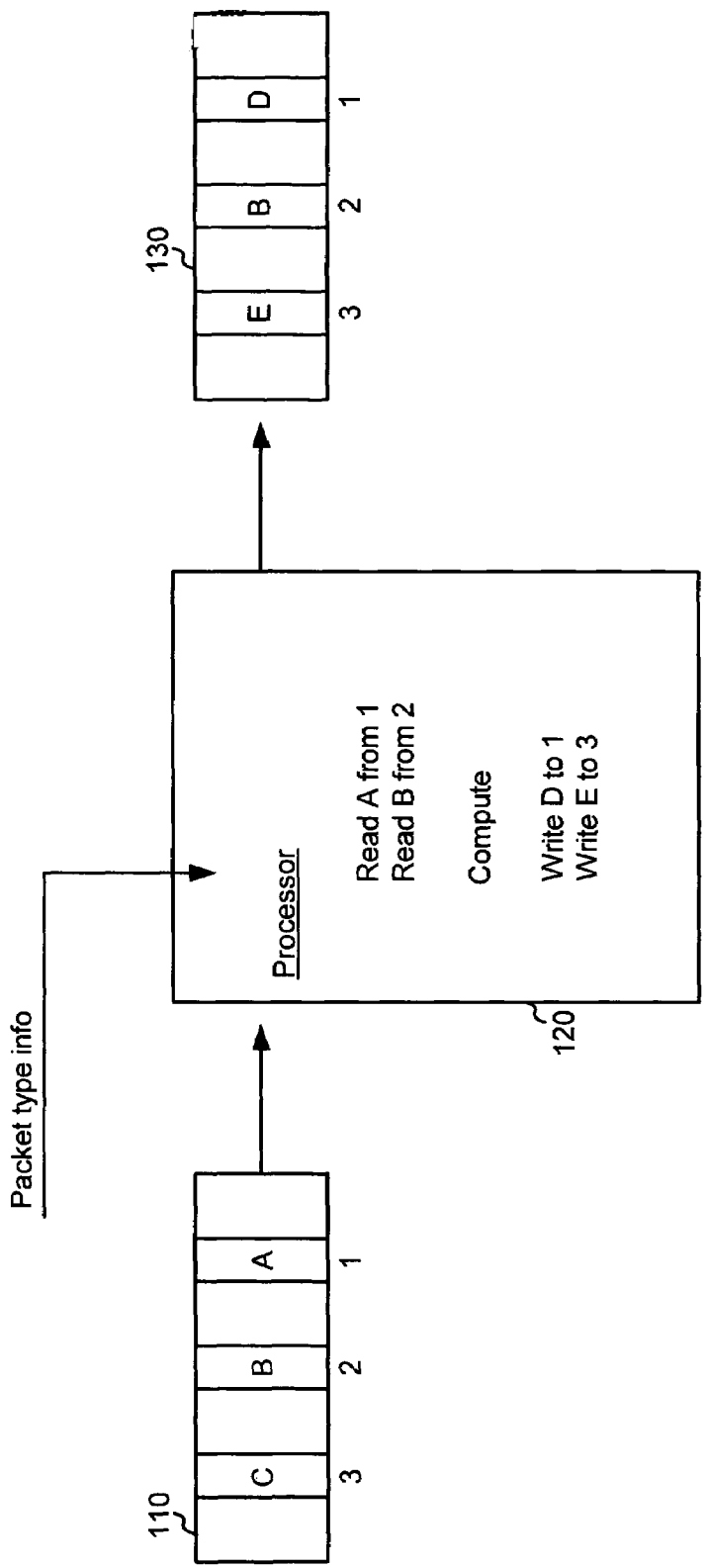
FIG. 1 is a diagram illustrating typical processing of an exemplary packet of data.

In operation (e.g., to perform the processing of FIG. 1), I/O device 210 may write a packet into memory 240 and a portion of the packet that contains data elements A–C into cache 230. In one implementation, the portion of the packet that contains data elements A–C may be written into cache 230 when the packet is written into memory 240. In another implementation, this portion of the packet may be written into cache 230 from memory 240 when it is needed by processor 220. Processor 220 may process some of data elements A–C from cache 230, including overwriting these elements with new data (e.g., D, E, etc.) as appropriate. When processing of the packet is finished, the portion of the packet in cache 230 may be combined with the packet in memory 240.

The processing system 200 advantageously avoids delays during processing by storing appropriate portions of packets to be processed in cache 230. Because data elements surrounding the data elements of interest (e.g., shown as shaded parts of three cache blocks in FIG. 2) are also stored in the cache, however, the phenomenon of "cache pollution" may occur. In cache pollution, the act of writing possibly multiple cache blocks of data for each packet to be processed may cause cache 230 to fill prematurely. Cache 230 may be viewed as "polluted," because data of interest may be ejected from cache 230 before it is used to make room for data from newer packets.

Scatter/Gather System Configuration

Figure 3:
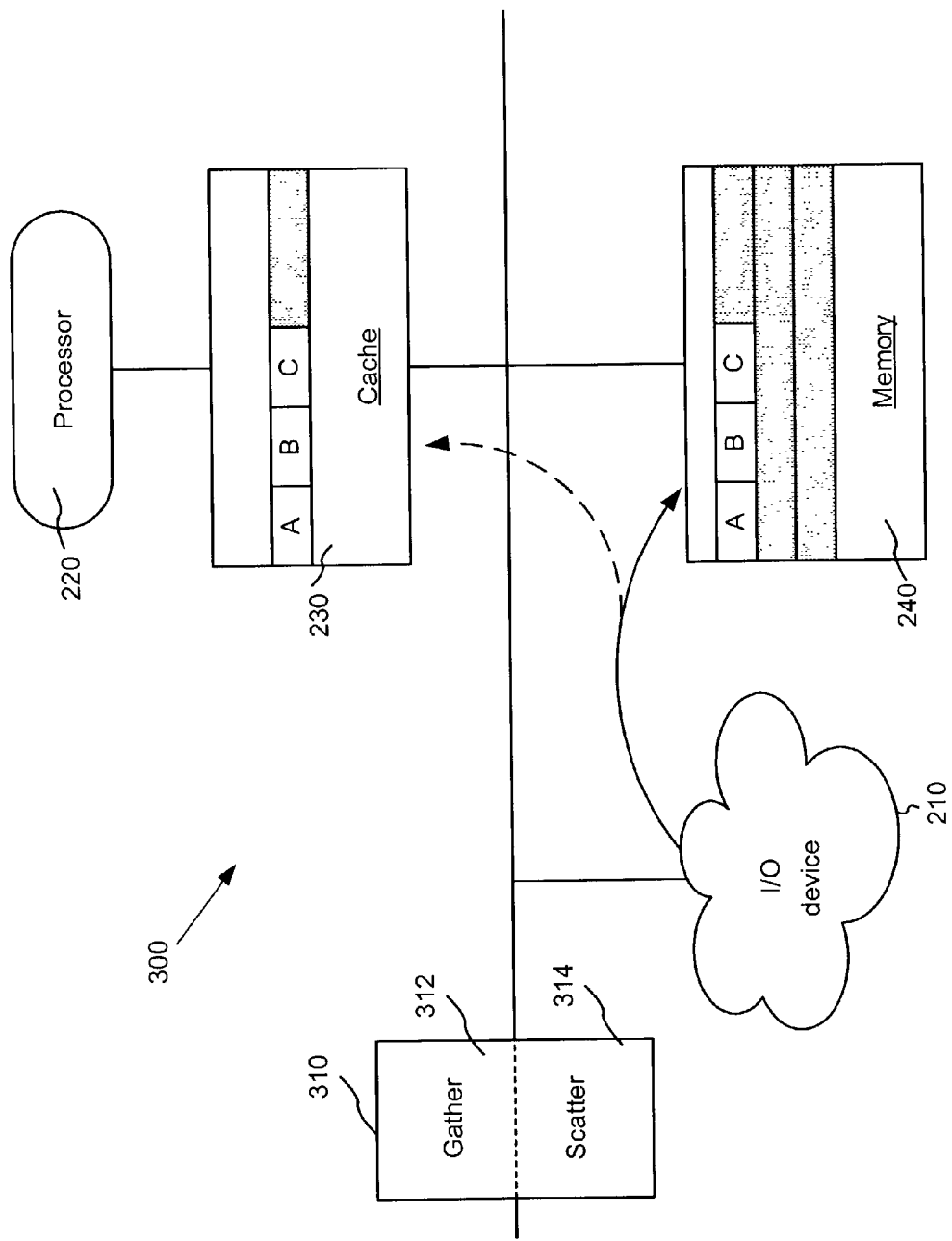
FIG. 3 is another processing system configured to process packets of data consistent with the principles of the invention.

FIG. 3 is a scatter/gather processing system 300 configured to process packets of data consistent with the principles of the invention. Scatter/gather processing system 300 may process packets rapidly, while avoiding the cache corruption possible in processing system 200. Scatter/gather processing system 300 may include I/O device 210, processor 220, cache 230, memory 240, and a scatter/gather unit 310. I/O device 210, processor 220, cache 230, and memory 240 may function as previously described, and only differences will be further described.

Scatter/gather unit 310 may include gather logic 312 and scatter logic 314. Although shown as part of a single unit 310, gather logic 312 and scatter logic 314 may be separately implemented, as will be appreciated by those skilled in the art.

Gather logic 312 may be preferably implemented in hardware, for example as part of an application-specific integrated circuit (ASIC), but also may be implemented in software, or some combination of hardware and software. Gather logic 312 may be configured to "gather" the data elements of interest (e.g., A–C), and write these "gathered items" to a contiguous portion of the packet. This contiguous portion may be, but need not be, at the beginning of the packet. Gather logic 312 may be configured to determine the locations of the data elements based on packet type information. For example, one packet type may have data elements of interest in one set of locations, and another packet type may use a different set of locations. Gather logic 312 may also be configured to generate one or more hashes and/or checksums from the gathered data items and append these hashes and/or checksums to the gathered data items.

Gather logic 312 may receive packet type information to determine which of the data elements A–C should be processed, and in what locations these elements may be found. In some cases, the packet type information may be located in the packet. In other cases, the packet type information may not be needed, if the locations of interest are the same for multiple types of packets.

The gathered, contiguous information that is generated by the gather logic may be referred to as a "digest" of its associated packet. Processor 220 may be configured to process the digest and produce a "modified" or "processed" digest of the packet (i.e., processed data elements).

Scatter logic 314 may be preferably implemented in hardware, for example as part of an ASIC, but also may be implemented in software, or some combination of hardware and software. Scatter logic 314 may be configured to "scatter" the processed data elements of interest (e.g., D, B, E) from their contiguous location, and write these "scattered items" to non-contiguous locations in the packet, which may be (but need not be) the original locations of the gathered data items A–C. Scatter logic 314 may be configured to determine the locations of the processed data elements based on packet type information.

Figure 4:
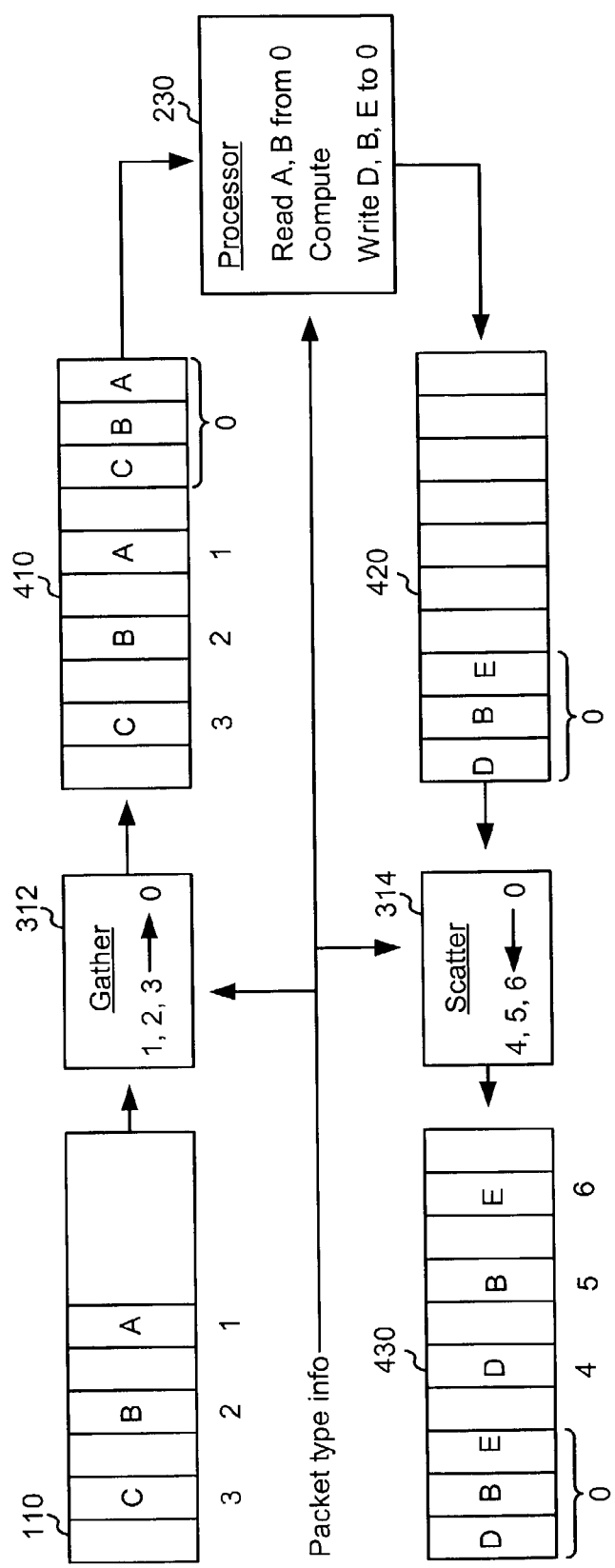
FIG. 4 is a diagram illustrating data flow and processing in the system of FIG. 3.

FIG. 4 is a diagram illustrating the flow of a packet 110 within scatter/gather system 300. An exemplary packet 110 may contain data elements of interest A, B, and C at locations 1, 2, and 3, respectively. Fewer or more data elements of interest are possible; the three shown are purely for explanation.

Gather logic 312 may gather data elements A–C from locations 1–3, and write them to location 0, resulting in a modified packet 410. Gather logic 312 may use packet type information to determine at least the locations (e.g., 1–3) from which to obtain the data elements of interest A–C.

Once the data of interest (e.g., A–C) are gathered to a contiguous location within the packet by gather logic 312, I/O device 210 may write the packet to memory 240 and may write the portion of the packet containing the contiguous location to cache 230. It should be noted that this portion of the packet that contains the contiguous location of data elements A–C may occupy a small portion of cache 230 (e.g., as few as one cache block).

Processor 220 may perform a block read of gathered elements A–C (or a subset thereof) from location 0 in modified packet 410. Regardless of where modified packet 410 is located (e.g., cache 230 or memory 240), a block read of a contiguous block of data may be performed more rapidly than a read of discontinuous locations, due to "spatial locality" as described above with respect to FIG. 1. Processor 220 may perform appropriate processing (e.g., route look-up) on at least some of data elements A–C based on the packet type information.

Processor 220 may perform a block write of the processed data elements of interest (e.g., D, B, E) to location 0, resulting in processed packet 420. Processor 220 may write these elements to location 0 in a contiguous block for the packet within cache 230 or to a location 0 for the packet within memory 240, as will be appreciated by those skilled in the art. A block (i.e., contiguous) write may also be performed faster by the processor 220 than a discontinuous write due to spatial locality.

Scatter logic 314 may scatter the processed data elements (e.g., D, B, E) at location 0 back to associated locations 4, 5, and 6 throughout the packet, resulting in a final packet 430. Scatter logic 314 may use packet type information to determine at least the locations (e.g., 4–6) to write the processed data elements of interest D, B, and E. It should be noted that locations 4–6 may, but need not, correspond to the original locations 1–3 in the packet from which data items A–C were gathered. Further, the number of data items scattered may differ from the number of data items gathered, notwithstanding that FIG. 4 shows three data items gathered and three data items scattered.

Exemplary Scatter/Gather Processing

FIG. 5 is a flow chart illustrating an exemplary operation of scatter/gather system 300 consistent with the principles of the invention. Where appropriate, reference may also be made to the packet flow diagram in FIG. 4. Processing may begin with gather logic 312 receiving a packet 110 and packet type information [act 510]. Gather logic 312 may gather data elements of interest (e.g., A–C) from the packet and place these gathered data elements in a predetermined location (e.g., location 0 in FIG. 4) [act 520]. This gathering and writing by gather logic 312 may be based on packet type information in the packet or based on one or more characteristics of the packet.

I/O device 210 may write the gathered data elements from predetermined location in the packet to cache 230 [act 530]. Processor 220 may process the gathered data elements (e.g., A–C in FIG. 4), and return processed data elements (e.g., D, B, E in FIG. 4) to cache 230 [act 540]. Processor 220 may perform a block read operation and a block write operation when transferring the gathered and processed data elements to and from cache 230 to reduce overall processing time.

The processed data elements (e.g., D, B, E in FIG. 4) may be read from cache 230 and associated with a related packet stored in memory 240 [act 550]. Those skilled in the art will appreciate that the association of the processed data elements with their packet may occur at memory 240 or at scatter logic 314.

Scatter logic 314 may receive the packet, possibly including the processed data elements, and packet type information. Scatter logic 314 may scatter the processed data elements throughout the packet (e.g., locations 4–6 in FIG. 4) based on the packet type information. I/O device 210 may send the processed packet from scatter/gather unit 310 to a destination, which may include a physical link.

CONCLUSION

As described above, data within a packet, such as header or other data, may be gathered to a contiguous location, processed, and scattered to its original locations. Pipelining of the gathering and scattering may improve overall processing time, despite these pre-processing and post-processing manipulations. Also, by gathering data elements in a block, the processor 220 may perform faster block reads and writes.

The foregoing description of preferred embodiments of the invention provides illustration and description, but is not intended to be exhaustive or to limit the invention to the precise form disclosed. Modifications and variations are possible in light of the above teachings or may be acquired from practice of the invention. Moreover, while a series of acts has been presented with respect to FIG. 5, the order of the acts may be different in other implementations consistent with principles of the invention. Additionally, lines with arrows are used in the figures to generally illustrate the flow of data. In practice, embodiments consistent with the principles of the invention may send data on these lines in both directions.

Although the principles of the invention have been described with respect to "packets," any other unit/chunk/collection of data may be processed in the same way. Packets and data elements in their headers are but one example of how the processing scheme described herein may be implemented.

Scatter/gather unit 310 may be implemented in hardware, software, or some combination thereof. For example, various portions of scatter/gather unit 310 may be implemented in ASICs. The ASICs may be configured to perform some processing via dedicated logic, and may also be configured to perform some processing using microcode instruction that may be stored in memory. Those skilled in the router art will appreciate that the invention described herein might be practiced using a variety of hardware configurations in addition to, or instead of, ASICs. For example, some combination of general purpose processors, digital signal processors (DSPs), and programmable gate arrays (PGAs) may also be utilized to implement the functionality described herein.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A system for processing data, comprising:
   a gathering device configured to gather a plurality of non-contiguous data items, received via a network, having a first ordering from a packet and construct a digest that contains the plurality of gathered data items in a second ordering, where the second ordering contains the plurality of gathered data items in a contiguous order;
   a first memory connected to the gathering device and configured to store the digest;
   a processor configured to process at least one of the plurality of data items from the digest in the first memory, the processor being further configured to write a plurality of processed data items to the digest in the first memory;
   a scattering device configured to scatter the plurality of processed data items from the digest in the first memory to a plurality of different locations in the packet, the different locations including processed data items in non-contiguous locations and processed data items in contiguous locations; and
   an interface configured to transmit the packet to a destination via the network, where the transmitted packet includes the processed data items in contiguous locations and the processed data items in non-contiguous locations.

2. The system of claim 1, further comprising:
   a second memory configured to store the packet.

3. The system of claim 2, further comprising:
   an input/output device configured to send the packet to the second memory and configured to send the digest to the first memory.

4. The system of claim 1,
   wherein the processor is configured to perform a block read of the plurality of data items from the first memory.

5. The system of claim 4, wherein the processor is further configured to perform a block write of the plurality of processed data items to the first memory.

6. The system of claim 1, wherein the digest includes packet type information, and
   wherein the processor is configured to process at least one of the plurality of data items from a digest in the first memory based on the packet type information.

7. The system of claim 6, wherein the gathering device is configured to gather the plurality of data items from the packet based on the packet type information.

8. A system for processing packets, comprising:
   a gather unit configured to gather data elements from a plurality of first non-contiguous locations in a packet, received via a network, and modify the packet by placing the data elements in a plurality of contiguous locations in the packet;
   a processor configured to process the gathered data elements from the plurality of contiguous locations to generate processed data elements; and
   a scatter unit configured to scatter the processed data elements to a plurality of second non-contiguous locations in the packet so that the packet includes the processed data elements in contiguous locations and the processed data elements in non-contiguous locations, and where the scatter unit is configured to make the packet available to a network for transmission to a destination.

9. The system of claim 8, wherein the gather unit gathers the data elements based on packet type information,
   wherein the processor processes the data elements based on the packet type information, and
   wherein the scatter unit scatters the processed data elements based on the packet type information.

10. The system of claim 9, wherein the packet type information is stored in the packet.

11. The system of claim 8, further comprising:
    a first memory unit configured to store the data elements from the plurality of contiguous locations in one or more blocks for rapid access by the processor; and
    a second memory configured to store the packet after modification by the gather unit.

12. The system of claim 11, wherein the processor is configured to write the processed data elements to the one or more blocks in the first memory.

13. A method for processing data, comprising:
    gathering data elements from a plurality of first discontinuous locations in a packet of data to form a continuous block of data, where the packet of data is received via a network;
    processing the continuous block of data to generate processed data elements;
    writing the processed data elements to the continuous block of data;
    scattering the processed data elements from the continuous block of data to a plurality of second discontinuous locations in the packet of data so that the packet of data includes processed data elements in discontinuous locations and processed data elements in continuous locations; and
    transmitting the packet that includes the processed data elements in continuous locations and discontinuous locations to a destination via the network.

14. The method of claim 13, further comprising:
receiving the packet of data and type information that indicates a type of the packet of data,
wherein the gathering, the processing, and the scattering are all based on the type information.

15. The method of claim 13, wherein the plurality of second discontinuous locations correspond to the plurality of first discontinuous locations.

16. A method for processing data, comprising:
gathering data elements from gathering locations in a packet to form a continuous block of data in the packet, where the packet is received via a network;
writing the continuous block of data to a first memory;
processing the continuous block of data to generate a processed block of data in the first memory;
writing the processed block of data in the first memory to the packet; and
scattering data elements from the processed block of data into scattering locations in the packet, where the packet includes processed data elements in continuous locations and processed data elements in discontinuous locations.

17. The method of claim 16, wherein the processing includes:
performing a block read of data elements from the continuous block of data in the first memory to obtain read data;
generating the processed block of data from the read data; and
performing a block write of the processed block of data to the first memory.

18. The method of claim 17, wherein the generating includes:
determining routing information for the packet from the read data; and
forming the processed block of data using the routing information.

19. The method of claim 16, further comprising:
receiving the packet and packet type information,
wherein the packet type information determines the gathering locations and the scattering locations.

20. The method of claim 16, wherein the gathering locations are identical to the scattering locations.

21. The method of claim 20, wherein the gathering locations include at least two locations that are spaced apart within the packet.

22. A device comprising:
means for gathering data elements from at least two discontinuous locations in a packet of data, received via a network, to a continuous block of data;
means for processing the continuous block of data and generating processed data elements in the continuous block of data;
means for scattering the processed data elements from the continuous block of data to the at least two discontinuous locations in the packet of data so that the packet of data includes processed data elements in discontinuous locations and processed data elements in continuous locations; and
means for transmitting the packet of data including the processed data elements in discontinuous locations and the processed data elements in continuous locations to a destination via the network.

* * * * *